United States Patent [19]
Lee et al.

[11] Patent Number: 5,660,524
[45] Date of Patent: Aug. 26, 1997

[54] AIRFOIL BLADE HAVING A SERPENTINE COOLING CIRCUIT AND IMPINGEMENT COOLING

[75] Inventors: Ching-Pang Lee, Cincinnati; Anne Marie Isburgh, Loveland; Donald George La Chapelle, Cincinnati; Paul Stuart Wilson, Fairfield, all of Ohio

[73] Assignee: General Electric Company, Cincinnati, Ohio

[21] Appl. No.: 912,440

[22] Filed: Jul. 13, 1992

[51] Int. Cl.$^6$ ........................................... F01D 5/18
[52] U.S. Cl. ................... 416/97 R; 416/241 R; 415/115; 415/200
[58] Field of Search ........................ 415/115, 116, 415/200; 416/96 R, 96 A, 97 R, 241 R

[56] References Cited

U.S. PATENT DOCUMENTS

| | | |
|---|---|---|
| 3,094,310 | 6/1963 | Bowmer ........................ 416/96 A |
| 3,191,908 | 6/1965 | Powell et al. . |
| 3,628,885 | 12/1971 | Sidenstick et al. . |
| 3,799,696 | 3/1974 | Redman . |
| 3,844,678 | 10/1974 | Sterman et al. . |
| 3,891,348 | 6/1975 | Auxier . |
| 4,073,599 | 2/1978 | Allen et al. . |
| 4,257,737 | 3/1981 | Andress et al. . |
| 4,312,624 | 1/1982 | Steinbauer, Jr. et al. . |
| 4,601,638 | 7/1986 | Hill et al. . |
| 4,627,480 | 12/1986 | Lee . |
| 4,770,608 | 9/1988 | Anderson et al. . |
| 5,203,873 | 4/1993 | Corsmeier et al. .................. 416/96 A |

FOREIGN PATENT DOCUMENTS

| | | | |
|---|---|---|---|
| 2555049 | 6/1976 | Germany ........................... 415/115 |
| 135606 | 7/1975 | Japan . |

*Primary Examiner*—Edward K. Look
*Assistant Examiner*—Christopher Verdier
*Attorney, Agent, or Firm*—Andrew C. Hess; Patrick R. Scanlon

[57] ABSTRACT

An airfoil blade, such as a jet engine turbine rotor blade. An internal serpentine coolant circuit has a last downstream passageway bounded by four monolithic inner walls which are monolithic with at least a portion of the outer walls. Two of the inner walls are spaced from the outer walls and contain air impingement orifices creating two impingement chambers. Some coolant in the serpentine circuit exits the airfoil blade through a coolant exit in the blade tip. The remaining coolant in the circuit passes through the impingement orifices and exits the blade through film cooling holes in the outer walls.

10 Claims, 2 Drawing Sheets

AIRFOIL BLADE HAVING A SERPENTINE COOLING CIRCUIT AND IMPINGEMENT COOLING

BACKGROUND OF THE INVENTION

The present invention relates generally to airfoil blades (such as those used in turbines, compressors, fans, and the like in a gas turbine engine), and more particularly to such an airfoil blade having improved internal cooling.

Turbines have airfoil-shaped blades which are employed to extract useful work from a hot moving fluid. Jet engines (also called gas turbine engines) include turbines which have some turbine blades attached to a rotating turbine rotor disc and some turbine blades (sometimes called vanes) attached to a non-rotating turbine stator casing. Modern aircraft jet engines have employed internal cooling of turbine blades to keep blade temperatures within design limits. Typically, the blade is cooled by air (typically bled from the engine's compressor) passing through a longitudinally extending cylindrical internal passage, with the air entering near the blade root (the attached portion of the blade) and exiting near the blade tip (the free end portion of the blade). Known turbine blade cooling techniques include a cooling circuit consisting of series-connected longitudinally-oriented passages producing serpentine flow which increase cooling effectiveness by extending the length of the coolant flow path. Known passages of a serpentine cooling circuit include a last downstream passage containing an insert spaced-apart from passage walls and having holes for impingement cooling of such walls with all the coolant in such passage then exiting such walls through film cooling holes leading to the outside of the airfoil blade. Serpentine cooling is efficient in that it reuses the cooling air in successive longitudinal passages of the serpentine cooling circuit, and impingement cooling has high heat transfer. However, impingement cooling is wasteful in that it does not reuse the cooling air and, when it also feeds film cooling holes, its high pressure leads to separation ("blow off") of the film cooling flow from the airfoil blade outside surface. What is needed is an airfoil blade having an improved combination of serpentine flow and impingement cooling techniques.

SUMMARY OF THE INVENTION

It is an object of the invention to provide an airfoil blade having improved internal cooling.

The airfoil blade of the invention includes a first and a second outer wall together defining an airfoil shape and an internal serpentine coolant circuit having series-connected generally longitudinally extending coolant passageways including a downstream passageway bounded by four monolithic inner walls. The inner walls include spaced-apart first and second inner walls which extend between, and are monolithic with at least a portion of, the first and second outer walls. The inner walls include a third inner wall which extends between the first and second inner walls and which is spaced apart from, and generally aligned with, one of the first and second outer walls. The airfoil blade also includes a first impingement chamber which is bounded by the first, second, and third inner walls and by the one outer wall. The third inner wall includes first impingement chamber air inlet orifices extending between the downstream passageway and the first impingement chamber. In a preferred embodiment, the blade tip has a coolant exit and the downstream passageway is a last downstream passageway terminating in fluid communication with the blade tip coolant exit.

Several benefits and advantages are derived from the invention. Having the monolithic-inner-wall passageway be monolithic with at least a portion of the outer walls eliminates the prior art insert problem of having the insert attachment vibrate loose from the outer wall which could result in ejection of the insert from the airfoil blade due to centrifugal force (and thermal failure of the blade itself in the absence of impingement cooling) where the airfoil blade is a rotating rotor blade. Additionally, the monolithic wall feature transfers heat better from the hot outer walls to the inner passageway walls than does the prior art insert design. Thus, the coolant within the passageway can carry more heat away.

BRIEF DESCRIPTION OF THE DRAWINGS

The accompanying drawings illustrate a preferred embodiment of the present invention wherein.

DETAILED DESCRIPTION OF THE INVENTION

Figure 2:
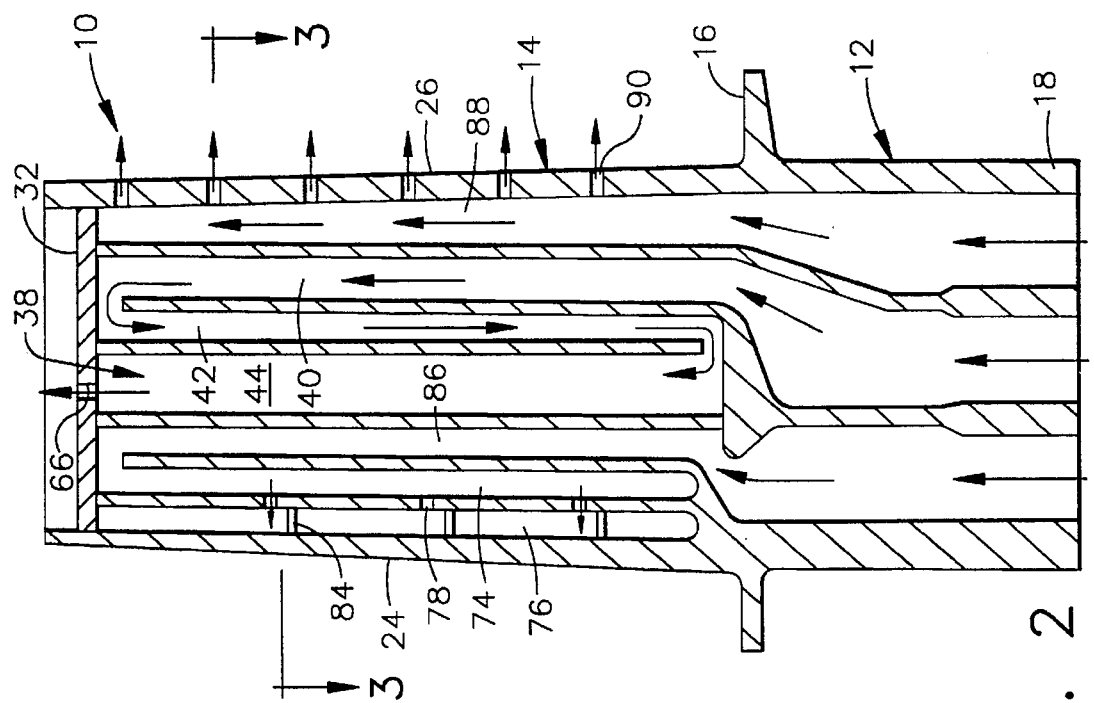
FIG. 2 is a longitudinal cross-sectional view of the turbine blade of FIG. 1.
Figure 1:
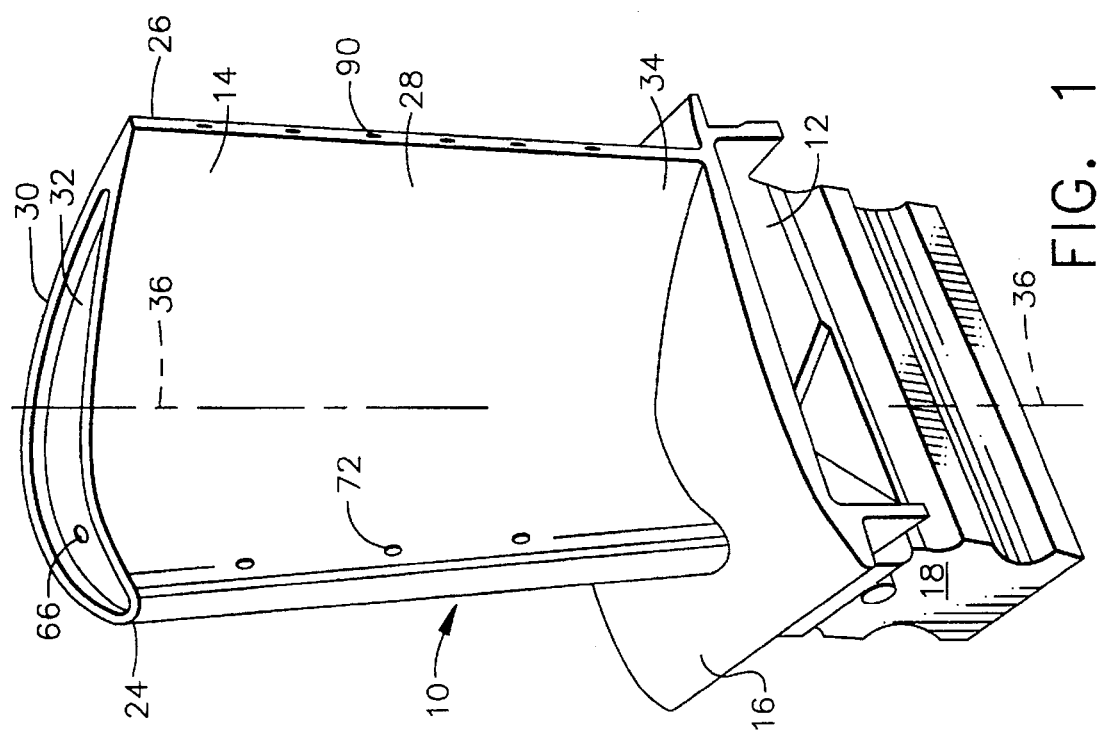
FIG. 1 is a perspective view of a jet engine turbine rotor blade which incorporates the airfoil blade of the invention.
Figure 3:
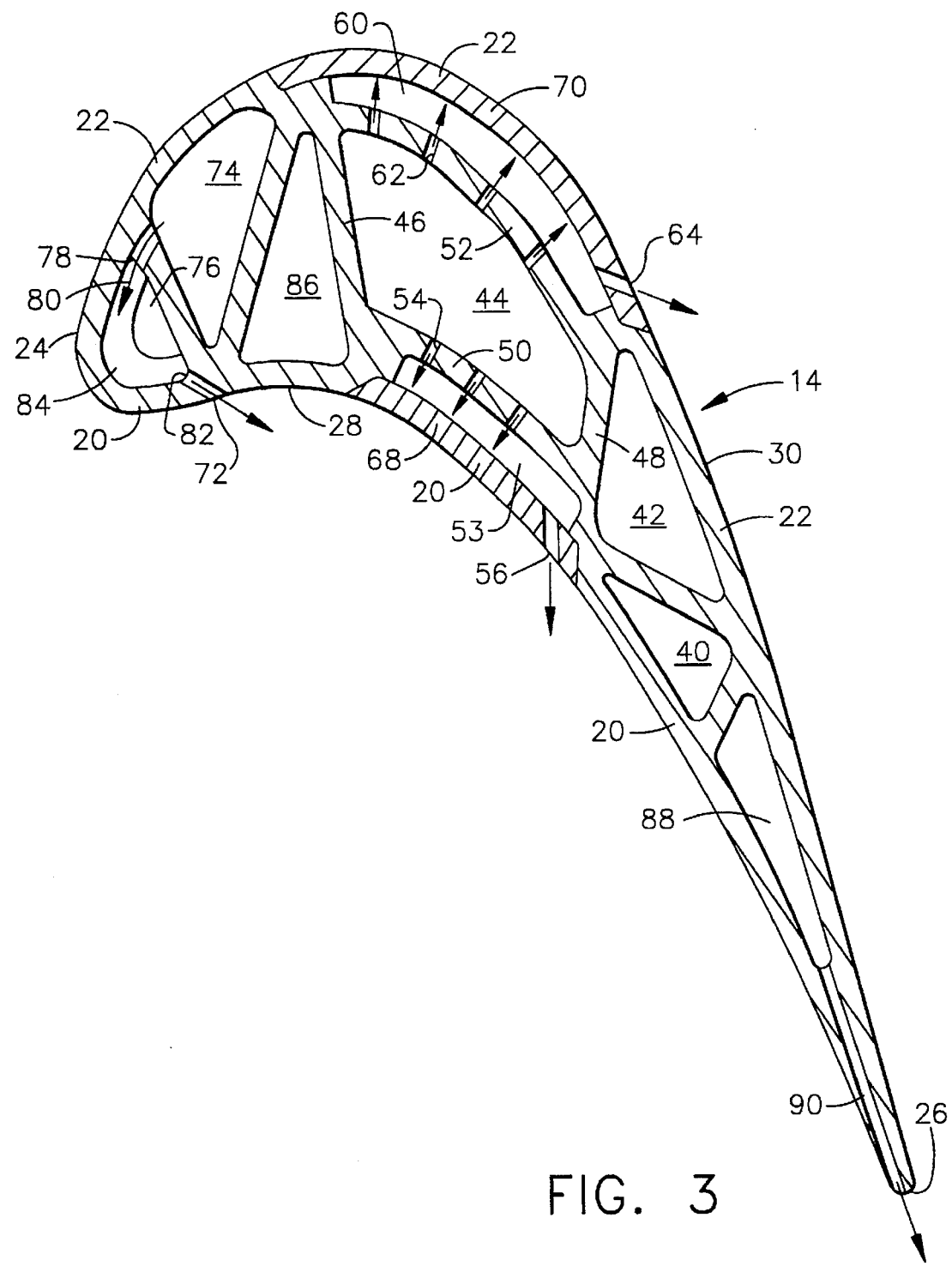
FIG. 3 is a cross-sectional view of the turbine blade of FIG. 1 taken along lines 3—3 in FIG. 2.

FIGS. 1, 2 and 3 disclose an aircraft jet engine turbine rotor blade 10 which includes a shank 12 and the airfoil blade 14 of the invention. The shank 12 includes a blade platform 16, which helps to radially contain the turbine air flow, and a dovetail 18, which attaches to a turbine rotor disc (not shown). The airfoil blade 14 has a first outer wall 20 and a second outer wall 22 together defining an airfoil shape including a leading edge 24, a trailing edge 26, a pressure side 28 along the first outer wall 20, a suction side 30 along the second outer wall 22, a blade tip 32, and a blade root 34. A longitudinal axis 36 extends outward toward the blade tip 32 and inward toward the blade root 34.

An internal serpentine coolant circuit 38 has (preferably three) series-connected generally longitudinally extending coolant passageways 40, 42, and 44. A passageway (42 or 44) is defined to be a downstream passageway if it receives coolant from another passageway in the serpentine coolant circuit 38. A passageway (44) is a last downstream passageway if it is the last passageway to receive coolant in the serpentine coolant circuit 38. Unnumbered arrows in FIGS. 2 and 3 indicate the path of coolant flow.

Downstream passageway (last downstream passageway) 44 is bounded by four monolithic inner walls 46, 48, 50, and 52. By "monolithic" is meant that the four inner walls are generally metallurgically homogeneous and continuous without attachments, such as (but not limited to) mechanical attachments such as bolts, clamps, and the like or metallurgical attachments such as brazing, welding, and the like. A first inner wall 46 and a second inner wall 48 are spaced apart. First and second inner walls 46 and 48 extend between, and are monolithic with at least a portion of, the first and second outer walls 20 and 22. The term "monolithic" has been previously defined so as to require the first and second inner walls 46 and 48 and at least a portion of the first and second outer walls 20 and 22 to be generally metallurgically homogeneous and continuous without attachments (such as, but not limited to, mechanical or metallurgical attachments). Preferably, as seen from FIG. 3, the first inner wall 46 is generally rectilinear and is monolithic with the first and second outer walls 20 and 22 between the first inner wall 46 and the leading edge 24 of the airfoil blade 14. Likewise, the second inner wall 48 preferably is generally rectilinear and is monolithic with the first and second outer walls 20 and 22 between the second inner wall 48 and the trailing edge 26 of the airfoil blade 14.

A third inner wall 50 extends between the first and second inner walls 46 and 48. The third inner wall 50 is spaced apart from, and generally aligned with, one of the first and second outer walls 20 and 22. A first impingement chamber 53 is bounded by the first, second, and third inner walls 46, 48, and 50 and by the one outer wall. Preferably the one outer wall is the first outer wall 20. The third inner wall 50 includes a multiplicity of first impingement chamber air inlet orifices 54 extending between the downstream passageway 44 and the first impingement chamber 53. The pressure side 28 of the airfoil blade 14 has at least one film cooling hole 56 in fluid communication with the first impingement chamber 53. At least one film cooling hole 56 is disposed closer to the trailing edge 26 of the airfoil blade 14 than any of the impingement orifices 54 of the third inner wall 50.

Likewise, the fourth inner wall 52 extends between the first and second inner walls 46 and 48. The fourth inner wall 52 is spaced apart from, and generally aligned with, the second outer wall 22. A second impingement chamber 60 is bounded by the first, second, and fourth inner walls 46, 48, and 52 and by the second outer wall 22. The fourth inner wall 52 includes a multiplicity of second impingement chamber air inlet orifices 62 extending between the downstream passageway 44 and the second impingement chamber 60. The suction side 30 of the airfoil blade 14 has at least one film cooling hole 64 in fluid communication with the second impingement chamber 60. At least one film cooling hole 64 is disposed closer to the trailing edge 26 of the airfoil blade 14 than any of the impingement orifices 62 of the fourth inner wall 52.

The blade tip 32 of the airfoil blade 14 has a coolant exit 66, and the last downstream passageway 44 of the serpentine coolant circuit 38 terminates in fluid communication with such coolant exit 66. In the serpentine coolant circuit 38, having some coolant exiting through the blade tip 32 reduces the pressure of the coolant exiting through the film cooling holes 56 and 64 (via the impingement orifices 54 and 62). This will prevent separation ("blow off") of the film cooling flow from the airfoil blade outside surface (i.e., the pressure side 28 and the suction side 30).

In an exemplary embodiment, the first outer wall 20 includes a segment 68 partially bounding the first impingement chamber 53. The first outer wall segment 68 is attached to, but is not monolithic with, the first and second inner walls 46 and 48. The first outer wall segment 20 has a higher heat conductivity and a lower yield strength than that of the first, second, and third inner walls 46, 48, and 50 (and of the portions of the first and second outer walls 20 and 22 which are monolithic with such inner walls).

Likewise, the second outer wall 22 includes a segment 70 partially bounding the second impingement chamber 60. The second outer wall segment 70 is attached to, but is not monolithic with, the first and second inner walls 46 and 48. The second outer wall segment 70 has a higher heat conductivity and a lower yield strength than that of the first, second, and fourth inner walls 46, 48, and 52 (and of the portions of the first and second outer walls 20 and 22 which are monolithic with such inner walls).

In a preferred design, the entire airfoil blade 14 (including the monolithic inner walls 46, 48, 50, and 52 and the portions of the first and second outer walls 20 and 22 which are monolithic with such inner walls), except for the first and second outer wall segments 68 and 70, is cast as a single piece from a material such as (but not limited to) an advanced nickel-based alloy. Then, the impingement orifices are drilled by, for example, a laser. Finally, the first and second outer wall segments 68 and 70 (which may be made from, but not limited to, an advanced nickel-aluminide alloy) are attached to the first and second inner walls 46 and 48, such as by brazing. It is noted that the weight bearing structure of the airfoil blade 14 does not include the outer wall segments 68 and 70 which provide for better heat transfer. Thus, in the case of attachment failure of an outer wall segment 68 or 70, the airfoil blade 14 itself will not fail as it will continue to have impingement cooling (and serpentine cooling exiting the blade tip). Other airfoil blade designs, not requiring different material outer wall segments, may be manufactured by casting the airfoil blade 14 as previously disclosed or by casting the entire airfoil blade 14 as a single piece.

In an exemplary design, the pressure side 28 of the airfoil blade 14 includes a film coolant hole 72 disposed proximate the leading edge 24, and the airfoil blade 14 further includes two generally longitudinally extending coolant passages 74 and 76 disposed between the first and second outer walls 20 and 22. One of the two coolant passages 76 is disposed proximate the leading edge 24 and has a coolant inlet 78 in fluid communication with the other of the two coolant passages 74. The coolant inlet 78 is disposed proximate the second outer wall 22 and has a direction of coolant flow (denoted by arrow 80) generally tangentially aligned with the second outer wall 22. The one coolant passage 76 has a coolant outlet 82 in fluid communication with the film coolant hole 72 of the pressure side 28 of the airfoil blade 14. The one coolant passage 76 further has a coolant guiding fin 84 extending from the coolant inlet 78 to the coolant outlet 82. Typically, the airfoil blade 14 would include a plurality of longitudinally spaced-apart film coolant holes 72.

In a preferred embodiment, the airfoil blade 14 also includes an additional generally longitudinally extending coolant passage 86 connected in serpentine fashion to coolant passage 74. Also, there is a generally longitudinally extending coolant channel 88 which is in fluid communication with trailing edge coolant slots 90. It is noted that coolant passageways 40 and 42 and coolant passages 74 and 86 have the wedge-shaped cross-sectional shapes of the rotation enhanced cooling cavities disclosed in U.S. patent application Ser. No. 07/628,871 filed Dec. 18, 1990, by Ching-Pang Lee et al. and entitled "Rotation Enhanced Rotor Blade Cooling Using a Single Row of Coolant Passageways".

The foregoing description of a preferred embodiment of the invention has been presented for purposes of illustration. It is not intended to be exhaustive or to limit the invention in the precise form disclosed (such as a particular number of coolant passageways, passages or channels), and obviously many modifications and variations are possible in light of the above teaching.

We claim:

1. An airfoil blade comprising:

(a) a first and a second outer wall together defining an airfoil shape including a leading edge, a trailing edge, a pressure side along said first outer wall, a suction side along said second outer wall, a blade tip, and a blade root;

(b) a longitudinal axis extending outward toward said blade tip and inward toward said blade root;

(c) an internal serpentine coolant circuit having series-connected generally longitudinally extending coolant passageways including a downstream passageway bounded by four monolithic inner walls, wherein:

(1) a first and a second inner wall are spaced apart and extend between, and are monolithic with at least a portion of, said first and second outer walls; and (2) a third inner wall extends between said first and second inner walls and is spaced apart from, and generally aligned with, one of said first and second outer walls; and (d) a first impingement chamber in downstream fluid communication with said downstream passageway and bounded by said first, second, and third inner walls and by said one outer wall, wherein said third inner wall includes a multiplicity of first impingement chamber air inlet orifices extending between said downstream passageway and said first impingement chamber.

2. The airfoil blade of claim 1, wherein said blade tip has a coolant exit, said downstream passageway is a last downstream passageway terminating in fluid communication with said coolant exit of said blade tip, said first and second inner walls are generally rectilinear, said first inner wall is monolithic with said first and second outer walls between said first inner wall and said leading edge, said second inner wall is monolithic with said first and second outer walls between said second inner wall and said trailing edge, and said one outer wall is said first outer wall.

3. The airfoil blade of claim 2, wherein said pressure side has at least one film cooling hole in fluid communication with said first impingement chamber and disposed closer to said trailing edge than any of said orifices.

4. The airfoil blade of claim 3, wherein said first outer wall includes a segment partially bounding said first impingement chamber, said first outer wall segment attached to, but not monolithic with, said first and second inner walls and having a higher heat conductivity and a lower yield strength than that of said first, second and third inner walls.

5. The airfoil blade of claim 4, wherein said pressure side includes a film coolant hole disposed proximate said leading edge and further including two generally longitudinally extending coolant passages disposed between said first and second outer walls, wherein one of said two passages is disposed proximate said leading edge, said one passage having a coolant inlet in fluid communication with the other of said two passages, said coolant inlet disposed proximate said second outer wall and having a direction of coolant flow generally tangentially aligned with said second outer wall, said one passage having a coolant outlet in fluid communication with said film coolant hole of said pressure side, and said one passage having a coolant guiding fin extending from said inlet to said outlet.

6. The airfoil blade of claim 2, also including a fourth inner wall extending between said first and second inner walls and spaced apart from, and generally aligned with, said second outer wall and a second impingement chamber in downstream fluid communication with said downstream passageway and bounded by said first, second, and fourth inner walls and by said second outer wall, wherein said fourth inner wall includes a multiplicity of second impingement chamber air inlet orifices extending between said downstream passageway and said second impingement chamber.

7. The airfoil blade of claim 6, wherein said pressure side has at least one film cooling hole in fluid communication with said first impingement chamber and disposed closer to said trailing edge than any of said orifices of said third inner wall, and wherein said suction side has at least one film cooling hole in fluid communication with said second impingement chamber and disposed closer to said trailing edge than any of said orifices of said fourth inner wall.

8. The airfoil blade of claim 7, wherein said first outer wall includes a segment partially bounding said first impingement chamber, said first outer wall segment attached to, but not monolithic with, said first and second inner walls and having a higher heat conductivity and a lower yield strength than that of said monolithic inner walls.

9. The airfoil blade of claim 8, wherein said second outer wall includes a segment partially bounding said second impingement chamber, said second outer wall segment attached to, but not monolithic with, said first and second inner walls and having a higher heat conductivity and a lower yield strength than that of said monolithic inner walls.

10. The airfoil blade of claim 9, wherein said pressure side includes a film coolant hole disposed proximate said leading edge and further including two generally longitudinally extending coolant passages disposed between said first and second outer walls, wherein one of said two passages is disposed proximate said leading edge, said one passage having a coolant inlet in fluid communication with the other of said two passages, said coolant inlet disposed proximate said second outer wall and having a direction of coolant flow generally tangentially aligned with said second outer wall, said one passage having a coolant outlet in fluid communication with said film coolant hole of said pressure side, and said one passage having a coolant guiding fin extending from said inlet to said outlet.

* * * * *